United States Patent
Wood

(10) Patent No.: US 9,413,939 B2
(45) Date of Patent: Aug. 9, 2016

(54) APPARATUS AND METHOD FOR CONTROLLING A CAMERA AND INFRARED ILLUMINATOR IN AN ELECTRONIC DEVICE

(75) Inventor: Christopher William Wood, Guelph (CA)

(73) Assignee: BlackBerry Limited, Waterloo, Ontario (CA)

( * ) Notice: Subject to any disclaimer, the term of this patent is extended or adjusted under 35 U.S.C. 154(b) by 916 days.

(21) Appl. No.: 13/326,507

(22) Filed: Dec. 15, 2011

(65) Prior Publication Data

US 2013/0155253 A1 Jun. 20, 2013

(51) Int. Cl.
*H04N 5/33* (2006.01)
*H04N 5/225* (2006.01)
*H04N 5/235* (2006.01)
*G03B 3/00* (2006.01)

(52) U.S. Cl.
CPC .......... *H04N 5/2256* (2013.01); *H04N 5/2351* (2013.01); *H04N 5/2354* (2013.01)

(58) Field of Classification Search
CPC .......... H04N 5/33; H04N 5/332; H04N 3/09; H04N 9/045; H04N 9/07; H04N 11/08; H04N 11/22; H04N 5/2354; H04N 5/2256; H04N 5/2351; H04N 9/735; G01J 5/02; G01J 2005/0077; G06T 3/4015; G03B 15/05
USPC ......................................................... 348/164
See application file for complete search history.

(56) References Cited

U.S. PATENT DOCUMENTS

| | | | | |
|---|---|---|---|---|
| 4,717,952 A | * | 1/1988 | Kohayakawa et al. | 348/164 |
| 4,866,285 A | * | 9/1989 | Simms | G03B 15/05 250/333 |
| 5,574,511 A | * | 11/1996 | Yang et al. | 348/586 |
| 5,956,122 A | * | 9/1999 | Doster | A61B 3/1216 351/210 |
| 6,704,054 B1 | * | 3/2004 | Hashimoto | G06K 9/00604 348/348 |

(Continued)

FOREIGN PATENT DOCUMENTS

| | | |
|---|---|---|
| GB | 2370958 A | 7/2002 |
| WO | 2011/047214 A2 | 4/2011 |

OTHER PUBLICATIONS

EPO, Extended Search Report, Application No. 11193739.7, Mar. 21, 2012, 5 pgs.

(Continued)

*Primary Examiner* — Sath V Perungavoor
*Assistant Examiner* — Howard D Brown, Jr.
(74) *Attorney, Agent, or Firm* — Fish & Richardson P.C.

(57) ABSTRACT

An apparatus and a method in an electronic device provide for controlling a camera and an infrared illuminator, wherein an image capturing process is initiated to produce image data representing a photographic scene. In response to initiating the image capturing process, an infrared illuminator is activated to illuminate the photographic scene. Reflected infrared light from the photographic scene is measured to produce exposure data. In response to the exposure data, a sensor is exposed and image data from the sensor in the electronic device is stored. The electronic device can be a wireless device. Exposure data can include an aperture size, an exposure duration, a lens position for focusing, and the like. Sensing a reflection of infrared light can indicate the presence of a subject in the photographic scene that can be illuminated. The infrared illuminator can be activated before or during the capturing of image data.

12 Claims, 3 Drawing Sheets

(56) References Cited

U.S. PATENT DOCUMENTS

| | | | | |
|---|---|---|---|---|
| 6,806,903 B1* | 10/2004 | Okisu | ................ | G06K 9/38 348/222.1 |
| 7,406,184 B2* | 7/2008 | Wolff et al. | ................ | 382/118 |
| 8,275,252 B1* | 9/2012 | Lu | ................ | H04N 5/2256 348/371 |
| 8,953,094 B2* | 2/2015 | Baer | ................ | H04N 5/2354 348/371 |
| 2004/0022531 A1* | 2/2004 | Schinner | ................ | G03B 7/00 396/67 |
| 2004/0246344 A1* | 12/2004 | Voss | ................ | H04N 5/23245 348/220.1 |
| 2006/0082995 A1* | 4/2006 | Chua | ................ | H04N 5/2256 362/231 |
| 2009/0167893 A1* | 7/2009 | Susanu | ................ | G06T 5/009 348/224.1 |
| 2011/0199482 A1* | 8/2011 | Morgan | ................ | 348/143 |
| 2013/0088602 A1* | 4/2013 | Unger | ................ | H04N 5/33 348/164 |

OTHER PUBLICATIONS

CIPO, Office Action, Application No. 2,794,067, Apr. 24, 2014, 2 pgs.

EPO, Summons to Attend Oral Proceedings Pursuant to Rule 115(1) EPC, Application No. 11193739.7, Nov. 18, 2014, 5 pgs.

EPO, Office Action, Application No. 11193739.7, Jan. 29, 2014, 4 pages.

* cited by examiner

APPARATUS AND METHOD FOR CONTROLLING A CAMERA AND INFRARED ILLUMINATOR IN AN ELECTRONIC DEVICE

The present disclosure relates generally to an electronic device, such as a digital camera, a cellular phone, a tablet computer, or other electronic device that includes a digital camera and an infrared illuminator. More particularly, the present disclosure relates to an apparatus and a method for controlling a camera with an infrared illuminator (e.g., an infrared emitter) in an electronic device wherein the camera can use the infrared illuminator during an image capture process.

BACKGROUND

Digital cameras have become small and inexpensive, and as a result, many electronic devices can include a digital camera. Examples of such electronic devices include many portable wireless electronic devices, such as cellular telephones, smart phones, tablet computers, laptop computers, and the like. These cameras can be convenient additions to electronic devices because they are often portable enough to be carried with the user at most times. The camera in a portable device can be used for taking pictures and videos, to document events and communicate with others. The camera can also be used as a data entry or data capture device, where the camera can be configured to scan documents and various types of bar codes. As computer processing power and storage capacity in portable electronic devices increases with improved technology, cameras can be used to capture vast amounts of image data (e.g., still photos and moving video images) and process, store, and communicate such data for many useful purposes.

A digital camera includes a lens that focuses light on a light sensor or image sensor, where the light is reflected from the subject of the scene, and from other objects in the scene. The sensor can convert the light, at each pixel location on the sensor, into digital data.

In many embodiments, before the camera captures image data, a camera sensor can be used to determine a proper exposure value, and whether or not additional illumination would improve the exposure of the scene. To determine a proper exposure value, light from the scene can be allowed into the camera and measured by the camera's image sensor, or by an alternate sensor used for metering a photographic scene. Based on these measurements, calculations can determine an opening size for the camera aperture and a duration for the exposure of the camera sensor.

If the camera determines that the amount of light entering the camera falls below a "low light" threshold, the camera can use an illuminator, or flash, to cast additional light on the scene, and take additional measurements while the illuminator is active. In some embodiments, the illuminator can be implemented with a light emitting diode (LED) that emits a balanced white light. In other embodiments, the illuminator can be implemented with a small incandescent bulb, or with a xenon tube flash. By controlling the illuminator during the metering process, proper values for aperture setting and exposure duration can be calculated before the actual pictures taken.

Disadvantages of using the illuminator to "preflash" the photo include annoying or distracting persons in the photographic scene, using additional time before the photograph is taken, and using energy for the preflash illumination. Persons in the photographic scene can be annoyed by additional flashes of light in the eyes. If too much time is taken before the photograph, a particularly interesting photographic moment may be lost because the camera was not fast enough to capture the image. And with regard to power consumption, conserving battery charge in a battery-powered device is always important to the goal of extending battery life.

In view of these deficiencies in the operation of cameras in electronic devices, an improved apparatus and method for controlling a camera in an electronic device is needed. It is in view of this background information related to the design and use of a camera in an electronic device that the significant improvements of the present disclosure have evolved.

DETAILED DESCRIPTION

Figure 1:
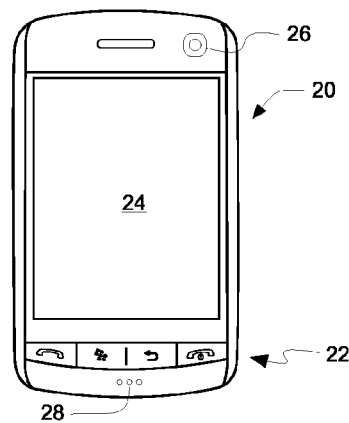
FIG. 1 is a front elevation view of an electronic device, such as a smart phone, having a camera and an infrared illuminator in accordance with an example embodiment of the present disclosure.

An implementation of the present disclosure advantageously provides an apparatus and a method for controlling a camera and an infrared illuminator in an electronic device. The disclosure generally relates to an electronic device, which can be a portable electronic device, or a wireless electronic device, in the embodiments described herein. Examples of an electronic device include a digital camera, a digital music player, or a digital scanner. Examples of a wireless device include mobile, or handheld, wireless communication devices, such as pagers, cellular phones, smart phones, wireless organizers, personal digital assistants, wirelessly enabled notebook computers, tablet computers, handheld computers, and the like.

For simplicity and clarity of illustration, reference numerals may be repeated among the figures to indicate corresponding or analogous elements. Numerous details are set forth to provide an understanding of the embodiments described herein. Some embodiments may be practiced without these details. In other instances, well-known methods, procedures, and components have not been described in detail to avoid obscuring the embodiments described. The description should not be considered as limited to the scope of the embodiments described herein.

Figure 2:
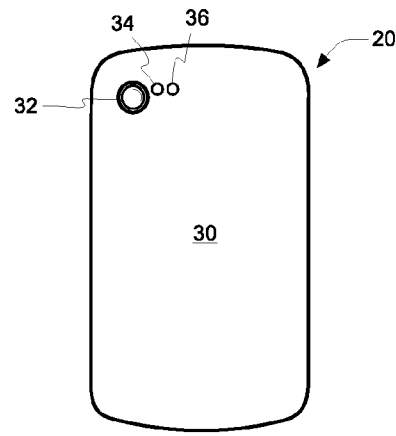
FIG. 2 is a rear elevation view of the electronic device of FIG. 1.

Referring first to FIGS. 1 and 2, a representative electronic device 20 is depicted. While in the example of FIGS. 1 and 2, electronic device 20 is a smart phone, other examples of electronic devices 20 can include a digital camera, a bar code scanner, a cellular telephone, a tablet computer, a laptop computer, and other similar data processing devices. Some of these exemplary electronic devices 20 can communicate wirelessly with a network, such as a cellular phone network, data network, or wireless local area network. Electronic device 20 may also be able to communicate data representing text, images, video, data files, command and control information, programs, and the like.

As shown in the front elevation view of FIG. 1, user operation of electronic device 20 can be implemented with buttons or keypad 22, which can be used to select various menus and functions. In other embodiments, data, menus, and functions of electronic device 20 can be displayed and selected (or otherwise manipulated) using display 24. In some embodiments, display 24 can incorporate a touchscreen, which is sensitive to human touch or input with a stylus. Using a touchscreen, an on-screen keypad can be implemented as a display of keys or buttons arranged on display 24. Keypad 22 and display 24 can be used together to enter text data into electronic device 20. Such data can be used to control, set parameters, or select operating modes for operating a camera, such as camera 26. Display 24 can be used to frame photographs or video, display photographs or video from memory, and to display menus or operating modes of camera 26. Microphone 28 can be used to record audio information, or provide other sound input to electronic device 20.

Electronic device 20 can include more than one camera, wherein such cameras can be arranged on the front, as shown at camera 26 in FIG. 1, and on the back of electronic device 20, as shown at camera 32 in the back elevation view of FIG. 2. In some embodiments, camera 32 on back 30 of electronic device 20 can be a higher quality camera for taking better photographs and video, while camera 26 on the front of electronic device 20 (see FIG. 1) can be a lower quality camera for operating in a video chat or video call mode, where image quality may not be as important.

In addition to camera 32, back 30 of electronic device 20 can include illuminator 34, which can produce light in the visible spectrum. In many cases, illuminator 34 can produce a bright white light having a spectrum balanced for capturing image data, such as taking a photograph or recording video. In an example embodiment, illuminator 34 can be implemented with a light emitting diode (an LED). In other embodiments, illuminator 34 can be implemented with an incandescent light bulb, such as a small halogen bulb. In battery powered electronic devices 20, reducing power consumption is an important part of extending useful battery life. Thus, an LED illuminator is a preferred implementation of illuminator 34 in battery powered electronic devices 20.

In accordance with the present disclosure, electronic device 20 can also include infrared illuminator (IR illuminator) 36, which can be used to emit infrared light on the subject of the photographic scene. In the embodiment shown in FIG. 2, both illuminator 34 and IR illuminator 36 are located near camera 32 on the back 30 of electronic device 20. Locating the illuminators near the camera can give a more pleasing angle of lighting when capturing photographs or recording video.

Figure 3:
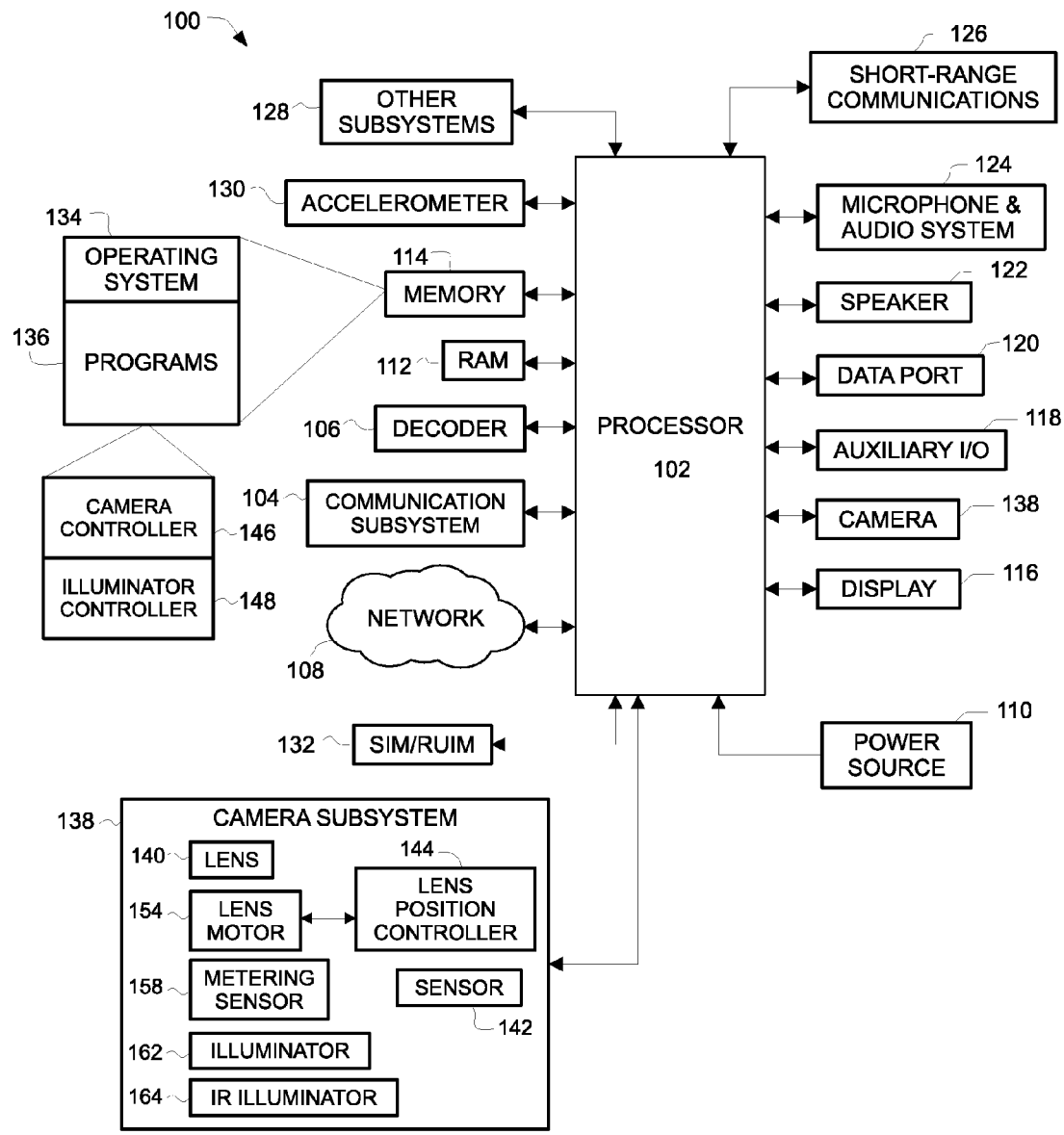
FIG. 3 depicts a functional block diagram of an electronic assembly for operation of the electronic device shown in FIGS. 1 and 2.

FIG. 3 depicts a high-level functional block diagram of an electronic assembly 100 for operating electronic device 20 shown in FIG. 1. Electronic assembly 100 can include multiple components, such as processor 102, which can control the overall operation of electronic device 20. I n some embodiments, communication functions provided by electronic device 20 can include voice, data, and command communications, which may be implemented by communication subsystem 104. Communication subsystem 104 can be used to initiate and support an active voice call or data communication session. Communication subsystem 104 can include various combinations of hardware, software, and firmware to perform various designed functions. The software can be functionally or conceptually divided into software modules. Software in one module may share or call upon functions in other modules.

Data received by electronic device 20 can be processed, including decompressed and decrypted, by decoder 106. Communication subsystem 104 can receive messages from, and send messages to, wireless network 108. Communication subsystem 104 can help initiate and operate an active call, wherein electronic device 20 is in a real-time voice communication session. Wireless network 108 may be any type of wireless network, including, but not limited to, a cellular network, a wireless data network, a wireless voice network, and a network that supports both voice and data communications. Wireless network 108 can use a variety of formats or protocols, such as those specified by standards including Global System for Mobile Communications (GSM), Code division multiples access (CDMA), wireless Ethernet (Institute of Electrical and Electronics Engineers standard 802.11), Wi-Fi, and other similar standards and wireless networking protocols.

Power source 110 can provide power to operate or charge electronic device 20, and can be implemented with one or more rechargeable batteries, or a port to an external power supply, wherein such power supply provides the appropriate power to all components of electronic assembly 100.

Processor 102 can interact with other components, such as random access memory (RAM) 112, memory 114, display 116 (illustrated in FIG. 1 as display 24), auxiliary input/output (I/O) subsystem 118, data port 120, speaker 122, microphone and audio system 124, short-range communications subsystem 126, and other subsystems 128. A user can enter data and operate functions of electronic device 20 with a data input device coupled to processor 102. Data input devices can include buttons or keypad 22 (see FIG. 1), or, in some embodiments, a graphical user interface produced on display 116, which can use touches and gestures detected by a touch-sensitive overlay on display 116. Processor 102 can interact with keypad 22 and/or the touch-sensitive overlay via an electronic controller (which can be represented by other subsystems 128). As part of the user interface, information, such as text, characters, symbols, images, icons, and other items that may be displayed or rendered on electronic device 20, can be displayed on display 116. Processor 102 can interact with accelerometer 130, which may be used to detect a direction of gravitational forces, or user-input acceleration forces. When using camera 26, accelerometer 130 can be used to record an orientation of a photograph. In other embodiments, buttons, such as buttons and keypad 22 in FIG. 1, can be used to operate select functions of electronic device 20.

To identify and authenticate a subscriber for obtaining access to wireless network 108, electronic device 20 can use a subscriber identity module or a removable user identity module (SIM/RUIM) card 132. Alternatively, user identification information can be programmed into memory 114.

Electronic device 20 can include operating system 134 and software programs 136, which can both be executed by processor 102. Operating system 134 and software programs 136 can be stored in a persistent, updatable store, such as memory 114. Additional applications or programs can be loaded onto electronic device 20 through wireless network 108, auxiliary I/O subsystem 118, data port 120, short-range communications subsystem 126, or any other subsystem 128 suitable for transferring program files. Software programs 136 can include software modules, such as camera controller module 146 and illuminator controller module 148, which are responsible for controlling the operation of camera subsystem 138 and processing or refining image data captured by camera system subsystem 138. Each of these software modules can call upon various hardware and software resources within electronic device 20 to execute the function. Additionally, functions described in the present disclosure can be implemented in various portions of electronic assembly 100, whether those portions be software modules or specialized hardware and firmware modules. In many instances, it may be possible to implement the same function in more than one portion of electronic assembly 100.

A received signal, such as a text message, an e-mail message, or web page download can be processed by communication subsystem 104 and input to processor 102. Processor 102 can processes the received signal for output to the display 116 and/or to the auxiliary I/O subsystem 118. A wireless device user may generate data items, for example e-mail messages containing a photograph, which may be transmitted over wireless network 108 through communication subsystem 104. For voice communications, the overall operation of electronic device 20 can be similar. Speaker 122 can be used to output audible information converted from electrical signals, and microphone and audio system 124 can be used to convert audible information into electrical signals for processing.

Camera subsystem 138 can include many hardware, software, and firmware modules that are needed to capture image data (e.g., visual data). Examples of image data includes still photographs, and the video frames included in the moving images of a video data file. For example, camera subsystem 138 can include lens 140, image sensor 142, and lens position controller 144. Image sensor 142 can include an array of millions of pixel sensors, wherein each is used to capture image data representing a single pixel in a photograph or in a frame of video. Image sensor 142 can be sensitive to light in the visible spectrum as well as light in the infrared spectrum. The infrared spectrum is electromagnetic radiation with a wavelength longer than that of visible light, measured from the nominal edge of visible red light at 0.7 micrometers, and extending conventionally to 300 micrometers. Thus infrared light has a lower frequency than visible light. Due to the longer wavelength of infrared light, human eyes are not able to visibly perceive it. Due to the lower frequency of IR light, it is of lower energy when compared to visible light, and would thus use less power for operation than a visible light illuminator.

Figure 4:
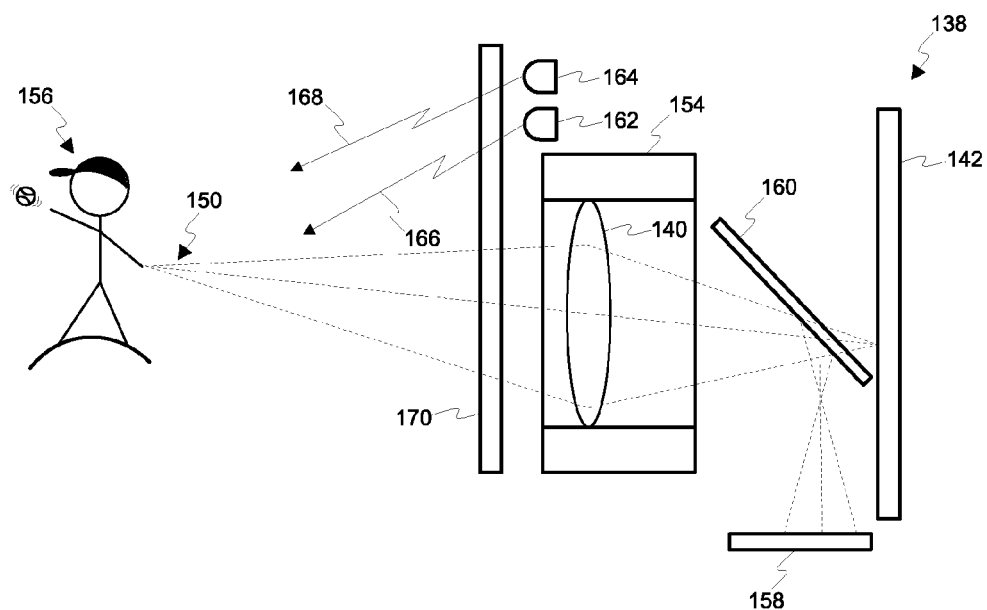
FIG. 4 is a schematic diagram of a camera subsystem in accordance with an example embodiment of the present disclosure.

As shown schematically in FIG. 4, lens 140 can be used to focus rays of light 150 (visible and infrared) from a photographic scene 156 onto the surface of the image sensor 142. Image sensor 142 converts incident light into image data, which can represent part of a photograph or frame of video. Such image data can be stored in RAM 112 or memory 114 by processor 102. Lens position controller 144 can produce signals for driving lens motor 154, or other suitable device, to correctly position lens 140 so that subject 156 of the photographic scene is properly focused.

In accordance with the present disclosure, camera subsystem 138 can also include metering sensor 158, which receives a portion of light rays 150 reflected by mirror 160 because mirror 160 can reflect only a portion of the energy in light rays 150 while allowing most of the energy in light rays 150 to pass through. Metering sensor 158 can be used to take various measurements and produce numeric values used to calculate an exposure value for image capture, or be used to determine whether or not light rays 150 from subject 156 are properly focused on image sensor 142.

Illuminator 162 can be used to emit visible light 166 on a photographic scene in order to help focus lens 140, and in order to improve and increase the amount of light in rays 150 that reach sensor 142. Increasing the amount of light that reaches sensor 142 can reduce exposure duration, thereby reducing the risk that the camera will shake and blur the captured image.

Similarly, infrared (IR) illuminator 164 can be used to emit infrared light 168 on a photographic scene. Infrared light reflected by objects in the scene can be used to help focus lens 140, or to improve and increase the amount of light or electromagnetic energy in rays 150 that reach sensor 142. Infrared light can also be used to sense whether there is an object or subject in the scene that can be illuminated with either visible or infrared light during image capture.

Camera subsystem 138 can be protected from dirt and other physical hazards by protective lens 170. Protective lens 170 may be selected to pass infrared light.

Camera controller module 146 in FIG. 3 can include software, firmware, or other hardware needed to control the operation or configuration of camera subsystem 138. For example, camera controller module 146 can include software for controlling the focusing of camera subsystem 138, and for controlling the aperture settings and exposure durations of camera subsystem 138. Camera controller module can interface with illuminator controller 148 to determine the appropriate illumination for both metering a scene and exposing a scene, using either visible light or infrared light.

Figure 5:
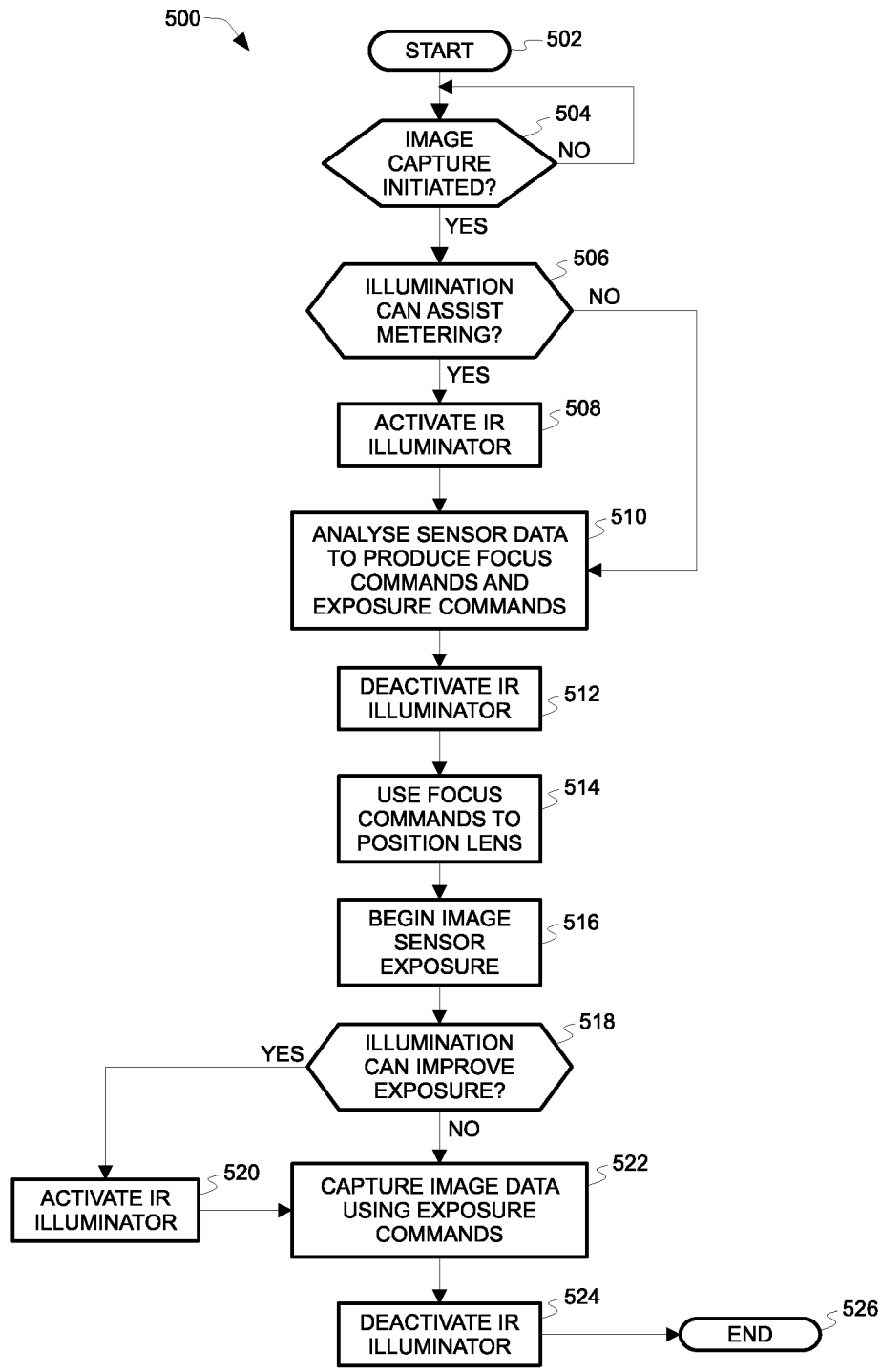
FIG. 5 is a flowchart illustrating a method of controlling a camera and an infrared illuminator, in accordance with an example embodiment of the present disclosure.

Referring now to FIG. 5, there is depicted a high-level flowchart illustrating an exemplary method of controlling a camera and an IR illuminator in an electronic device, in accordance with one or more exemplary embodiments of the present disclosure. Such exemplary methods can be controlled by software that can be executed on hardware shown in FIG. 3. For example, the method may be controlled by camera controller module 146 and executed on processor 102 within electronic assembly 100. Other embodiments can use various combinations of hardware, firmware, or software to perform similar methods and processes.

As illustrated, method 500 begins at block 502, and continues at block 504, wherein the method determines whether an image capture has been initiated. In one embodiment, an image capture can be initiated, for example, by placing electronic device 20 in an image capture mode, which can include a camera mode for taking photographs or a video mode for recording moving images and sound. Thus, the user initiates an image capture by placing electronic device 20 in a configuration that uses camera subsystem 138 to capture image data.

Next, the method determines whether illumination can assist in metering a photographic scene, as illustrated at block 506. The process of metering a scene can include measuring photographic characteristics of the scene. In one embodiment, the method can analyze the average amount of light, or contrast, or combination of other image characteristics that can be used to indicate that the scene is in a low light condition. When such image characteristics fall below a low-light threshold, it is likely that the user is attempting to photograph a lowlight scene, and it is likely that illumination can assist in metering and focusing the scene, and that illumination can improve the captured photograph. If the image sensor (such as image sensor 142) or the metering sensor (such as metering sensor 158) indicate that the scene is reflecting an amount of light sufficient to produce a well exposed photograph, method 500 can pass to block 510. If not, the method proceeds to block 508.

Note that in some embodiments, the IR illuminator can be activated to illuminate the scene, and measurements can be taken of the infrared light reflections. The infrared light reflected by the scene can be used to determine whether or not later visible-light illumination can assist in metering the photographic scene. By initially using infrared illumination, the method can determine whether or not there is a light-reflecting object or subject in the scene that can be illuminated with visible light during the exposure of the actual photograph to improve the photograph. If a measurement of the reflected infrared light exceeds a reflected infrared light threshold, the method can assume that there is a subject that can be illuminated during the capturing of image data.

Since infrared illumination is not readily visible to human eyes, the method can discreetly analyze the scene of a potential photograph and begin to configure camera subsystem 138 to capture image data from the current scene. Using infrared light to pre-flash or pre-analyze a scene can save energy and reduce the annoyance or confusion of people in the scene, which can be caused by periodically pre-flashing with visible light.

In accordance with the present disclosure, if illumination can assist in metering, the method activates the IR illuminator, as depicted at block 508. In one embodiment, this can be implemented by using camera controller module 146 to send an instruction to illuminator controller 148 that activates IR illuminator 164 in camera subsystem 138 (see FIG. 3). IR illuminator 164 can be activated continuously, or, to save energy, IR illuminator 164 can be activated in periodic bursts. If capturing image data includes capturing video, then IR illuminator 164 can be activated continuously during video recording.

After activating the IR illuminator, method 500 analyzes sensor data to produce exposure data, which can include, for example, focus commands and exposure commands, as depicted at block 510. In various embodiments, sensor data can be produced by the main image sensor 142 or by metering sensor 158, which, in some embodiments, can be specialized for measuring the exposure value of different frequencies of light. Focus commands can be used to position lens 140 so that it properly focuses light from a photographic subject 156 on image sensor 142. Such focus commands can be instructions to lens motor 154 to precisely move lens 140 with respect to sensor 142. Exposure commands can include instructions for controlling an aperture opening and instructions specifying a duration for properly exposing image sensor 142. Exposure commands can also take into consideration whether illuminator 162 or IR illuminator 164 will be activated during image exposure. Exposure data can also be referred to as exposure parameters, which include parameters describing various settings needed to properly capture image data. For example, such exposure data can include focus settings, aperture settings, exposure duration, image sensor sensitivity, illumination controls for visible and/or infrared light illuminators, filter controls, special effects controls, and the like.

After the analysis of the sensor data, the IR illuminator is deactivated, as illustrated at block 512. Next, method 500 can use focus commands to position the camera lens, as depicted at block 514. In some embodiments, the focus commands may be able to direct lens motor 154 to set lens 140 at a precise position. In other embodiments, focus commands may be a sequence of lens positioning commands that are given to lens motor 154 in an iterative process that will converge upon the proper location for lens 140 to focus the subject on image sensor 142. At each step in such an iterative process, the IR illuminator may be activated for taking additional measurements.

After positioning the lens to properly focus the image, process 500 can begin image sensor exposure, as illustrated at block 516. This can be implemented by opening an aperture to a predetermined opening and allowing light to pass through lens 140 onto image sensor 142 for a predetermined exposure time.

After beginning the image exposure, the method determines whether or not illumination can improve the image exposure, as depicted at block 518. If illumination can improve the image exposure, the process passes to block 520, wherein the IR illuminator is activated. In some embodiments, IR illuminator 164 can be activated to produce infrared light 168 to supplement the exposure of visible light image. For example, when photographing a low-light scene, which will usually result in a photograph with poorly saturated color, activating IR illuminator 164 can enhance a photograph that will turnout to be nearly a black-and-white photo. In other embodiments, activating IR illuminator 164 can help take additional measurements, during image exposure, in order to make fine tuning adjustments to focusing or image exposure values. In some situations, both visible light illuminator 162 and IR illuminator 164 can be used together to illuminate the scene. If both illuminators 162 and 164 are used together, the illuminators 162, 164 can be used with different intensities, or durations, or in a selected ratio of one to another.

If illumination cannot be used to improve the exposure, method 500 passes from block 518 to block 522, wherein the method captures image data using the exposure commands. Capturing image data can be implemented by opening an aperture to a prescribed diameter for a predetermined duration based on the analysis of sensor data at block 510.

Next, method 500 deactivates the IR illuminator (if it had been activated during the image exposure), as illustrated at block 524. Thereafter, method 500 of controlling a camera and an IR illuminator ends, as depicted at block 526.

In some embodiments of the disclosure, camera subsystem 138 can capture image data more than once for the same scene, wherein the visible light illuminator can be activated for capturing a first set of image data, and the IR illuminator can be activated for capturing a second set of image data. Thereafter, these two sets of image data can then be merged by selecting aspects of each data set that will produce an enhanced final set of image data, which final image data combines desirable characteristics and aspects of the multiple data sets. This technique can be similar to image processing techniques that can be used to produce so-called "high dynamic range" images, or image processing techniques referred to as "focus stacking" for producing images with a greater depth of field.

Presently preferred embodiments of the disclosure, and many improvements and advantages thereof, have been described with particularity. The description includes preferred examples of implementing the disclosure, and these descriptions of preferred examples are not intended to limit the scope of the disclosure. The scope of the disclosure is defined by the following claims.

What is claimed is:
1. An electronic device comprising:
  a processor;
  a memory coupled to the processor;
  a camera subsystem coupled to the processor for capturing an image and storing the image as data in the memory, the camera subsystem including an infrared illuminator and a visible-light illuminator; and
  a camera controller module coupled to the camera subsystem, the camera controller module configured to perform the following:
    responsive to initiation of an image capture process, illuminating a scene using infrared light emitted by the infrared illuminator at a first time prior to exposure of the scene and receiving reflected infrared light to produce exposure data, the exposure data indicating whether a subject, present in the scene, can be illuminated during the exposure of the scene to improve a photograph of the scene, determining appropriate illumination for exposing the scene based on the exposure data, and selectively activating both the infrared illuminator and the visible-light illuminator to illuminate the scene at a second time later than the first time during the image capture process based on the determined appropriate illumination associated with the infrared illuminator performed at the first time.

2. The electronic device of claim 1 wherein the appropriate illumination is at least partially determined by whether the subject can be illuminated.

3. The electronic device of claim 1 wherein the camera controller module activates the visible-light illuminator in the camera subsystem in response to the received reflected infrared light exceeding a reflected infrared light threshold.

4. The electronic device of claim 1 wherein the camera controller module activates the infrared illuminator while the image is captured by the camera subsystem.

5. The electronic device of claim 1 wherein the camera controller module further activates the infrared illuminator and the visible-light illuminator in the camera subsystem while the image is captured by the camera subsystem.

6. The electronic device of claim 1 wherein the camera controller module further calculates exposure parameters in response to the received reflected infrared light, wherein the received reflected infrared light was emitted by the infrared light illuminator.

7. The electronic device of claim 1 wherein the camera controller module further activates the infrared illuminator during an exposure of an image sensor in the camera subsystem to capture the image.

8. A method for controlling a camera in an electronic device, the camera comprising a visible-light illuminator and an infrared illuminator, the method comprising:

illuminating a photographic scene using infrared light emitted by the infrared illuminator at a first time prior to exposure of the photographic scene and receiving reflected infrared light from illuminating the photographic scene to produce exposure data, the exposure data indicating whether a subject, present in the photographic scene, can be illuminated during the exposure of the photographic scene to improve a photograph of the photographic scene;

determining appropriate illumination for exposing the photographic scene based on the exposure data; and exposing an image sensor to capture the photographic scene and storing image data from the image sensor while selectively activating both the infrared illuminator and the visible-light illuminator at a second time later than the first time based on the determined appropriate illumination associated with the infrared illuminator performed at the first time.

9. The method of claim 8 wherein illuminating the photographic scene comprises activating the infrared illuminator and sensing a reflection of infrared light indicating that the subject in the photographic scene can be illuminated.

10. The method of claim 9 further comprising:

activating the visible-light illuminator in response to the sensing a reflection of infrared light indicating that the subject in the photographic scene can be illuminated; and receiving reflected visible light from the photographic scene to produce the exposure data.

11. The method of claim 8 further comprising:

activating the infrared illuminator to illuminate the photographic scene while exposing the image sensor and capturing a first set of image data;

activating the visible-light illuminator to illuminate the photographic scene while exposing the image sensor and capturing a second set of image data; and combining elements of the first set of image data with elements of the second set of image data to produce a third set of image data.

12. The method of claim 8, wherein the appropriate illumination is at least partially determined by whether the subject can be illuminated.

* * * * *